United States Patent
Lee et al.

(10) Patent No.: US 12,531,273 B2
(45) Date of Patent: Jan. 20, 2026

(54) LITHIUM-SULFUR BATTERY ELECTROLYTE WITH MULTI-COMPONENT ORGANIC SOLVENT SYSTEM, AND LITHIUM-SULFUR BATTERY

(71) Applicant: LG ENERGY SOLUTION, LTD., Seoul (KR)

(72) Inventors: Jaegil Lee, Daejeon (KR); Suenghoon Han, Daejeon (KR); Eui Tae Kim, Daejeon (KR); Seonghyo Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 500 days.

(21) Appl. No.: 17/923,561

(22) PCT Filed: Nov. 15, 2021

(86) PCT No.: PCT/KR2021/016662
§ 371 (c)(1),
(2) Date: Nov. 4, 2022

(87) PCT Pub. No.: WO2022/108277
PCT Pub. Date: May 27, 2022

(65) Prior Publication Data
US 2023/0187701 A1    Jun. 15, 2023

(30) Foreign Application Priority Data
Nov. 23, 2020 (KR) .................. 10-2020-0157907

(51) Int. Cl.
| | |
|---|---|
| H01M 10/05 | (2010.01) |
| H01M 4/40 | (2006.01) |
| H01M 4/58 | (2010.01) |
| H01M 10/052 | (2010.01) |
| H01M 10/0568 | (2010.01) |
| H01M 10/0569 | (2010.01) |
| H01M 4/02 | (2006.01) |

(52) U.S. Cl.
CPC ....... *H01M 10/0569* (2013.01); *H01M 4/405* (2013.01); *H01M 4/5815* (2013.01); *H01M 10/052* (2013.01); *H01M 10/0568* (2013.01); *H01M 2004/027* (2013.01); *H01M 2004/028* (2013.01); *H01M 2300/004* (2013.01)

(58) Field of Classification Search
CPC ......... H01M 10/0569; H01M 10/0567; H01M 10/0566; H01M 10/0564; H01M 10/052; H01M 10/0568; H01M 4/405; H01M 4/5815; H01M 2004/027; H01M 2004/028; H01M 2300/004
See application file for complete search history.

(56) References Cited

U.S. PATENT DOCUMENTS

| | | |
|---|---|---|
| 4,489,145 A | 12/1984 | Abraham et al. |
| 2002/0045102 A1 | 4/2002 | Jung et al. |
| 2002/0160269 A1 | 10/2002 | Choi et al. |
| 2003/0073005 A1 | 4/2003 | Kim et al. |
| 2004/0048164 A1 | 3/2004 | Jung et al. |
| 2004/0259002 A1 | 12/2004 | Kim et al. |
| 2005/0147891 A1 | 7/2005 | Mikhaylik |
| 2005/0175904 A1 | 8/2005 | Gorkovenko |
| 2006/0199080 A1 | 9/2006 | Amine et al. |
| 2007/0212615 A1 | 9/2007 | Jost et al. |
| 2014/0342242 A1 | 11/2014 | Egorov et al. |
| 2015/0318575 A1 | 11/2015 | Choi et al. |
| 2016/0233548 A1 | 8/2016 | Yamada et al. |
| 2016/0322665 A1 | 11/2016 | Kim et al. |
| 2016/0336625 A1 | 11/2016 | Jeong et al. |
| 2018/0294476 A1 | 10/2018 | Zhamu et al. |
| 2018/0342758 A1 | 11/2018 | Tang et al. |
| 2019/0051940 A1 | 2/2019 | Park et al. |
| 2019/0088980 A1 | 3/2019 | Park et al. |

(Continued)

FOREIGN PATENT DOCUMENTS

| | | |
|---|---|---|
| CN | 104051786 A | 9/2014 |
| CN | 104638299 A | 5/2015 |
| CN | 104659422 A | 5/2015 |
| CN | 108091925 A | 5/2018 |
| CN | 108281659 A | 7/2018 |
| CN | 109075393 A | 12/2018 |
| EP | 3831771 A1 | 6/2021 |
| JP | 2002-075446 A | 3/2002 |
| JP | 2004-103560 A | 4/2004 |
| JP | 2007-518229 A | 7/2007 |
| JP | 2008-532248 A | 8/2008 |
| JP | 2016-219411 A | 12/2016 |

(Continued)

OTHER PUBLICATIONS

Chao, S. et al., (1987) "Solid-State Microelectrochemistry: Electrical Characteristics of a Solid-State Microelectrochemical Transistor Based on Poly(3-Methylthiophene)," Journal of the American Chemical Society, 109(7), pp. 2197-2199.

Wu Yang et al., (2017) "Pyrrole as a Promising Electrolyte Additive to Trap Polysulfides for Lithium-Sulfur Batteries," Journal of Power Sources, vol. 348, pp. 175-182.

*Primary Examiner* — Raymond Alejandro
(74) *Attorney, Agent, or Firm* — Bryan Cave Leighton Paisner LLP

(57) ABSTRACT

An electrolyte for a lithium-sulfur secondary battery and a lithium-sulfur secondary battery including the same are provided. The electrolyte includes: a lithium salt; and a non-aqueous organic solvent, where the non-aqueous organic solvent includes: a first solvent including a conjugated cyclic ether-based compound; a second solvent including dimethoxyethane; and a third solvent including a glyme-based compound represented by Chemical Formula 1:

$$R_1(CH_2CH_2O)_nR_2 \quad \text{[Chemical Formula 1]}$$

in Chemical Formula 1, $R_1$ and $R_2$ are the same as or different from each other, and each independently an alkyl group or alkoxy group having 1 to 10 carbon atoms; and n is an integer of 2 to 4.

11 Claims, No Drawings

(56) References Cited

U.S. PATENT DOCUMENTS

2021/0226254 A1     7/2021   Kim et al.
2021/0242502 A1*  8/2021   Ha .......................... H01M 4/38

FOREIGN PATENT DOCUMENTS

| | | |
|---|---|---|
| JP | 6424436 B2 | 11/2018 |
| KR | 10-2002-0083117 A | 11/2002 |
| KR | 10-2003-0031396 A | 4/2003 |
| KR | 10-2004-0022972 A | 3/2004 |
| KR | 10-2004-0086920 A | 10/2004 |
| KR | 10-0578797 B1 | 5/2005 |
| KR | 10-2006-0135958 A | 12/2006 |
| KR | 10-2007-0027512 A | 3/2007 |
| KR | 10-2008-0067964 A | 7/2008 |
| KR | 10-2013-0093261 A | 8/2013 |
| KR | 10-2014-0066567 A | 6/2014 |
| KR | 10-2014-0135038 A | 11/2014 |
| KR | 10-2015-0072239 A | 6/2015 |
| KR | 10-2016-0128014 A | 11/2016 |
| KR | 10-2017-0067648 A | 6/2017 |
| KR | 10-2017-0084452 A | 7/2017 |
| KR | 10-2018-0066169 A | 6/2018 |
| KR | 10-1925051 B1 | 11/2018 |
| KR | 10-1940152 B1 | 1/2019 |
| KR | 10-2019-0125740 A | 11/2019 |
| KR | 10-2020-0061293 A | 6/2020 |
| WO | 2020/105981 A1 | 5/2020 |

\* cited by examiner

LITHIUM-SULFUR BATTERY ELECTROLYTE WITH MULTI-COMPONENT ORGANIC SOLVENT SYSTEM, AND LITHIUM-SULFUR BATTERY

CROSS-REFERENCE TO RELATED APPLICATIONS

This application is a National Phase entry pursuant to 35 U.S.C. § 371 of International Application No. PCT/KR2021/016662, filed on Nov. 15, 2021, and claims the benefit of and priority to Korean Patent Application No. 10-2020-0157907, filed on Nov. 23, 2020, the disclosures of which are incorporated by reference in their entirety for all purposes as if fully set forth herein.

TECHNICAL FIELD

The present disclosure provides an electrolyte for a lithium-sulfur battery, and a lithium-sulfur battery including the same.

BACKGROUND

As the scope of application of lithium secondary batteries expands not only to portable electronic devices and communication devices, but also to electric vehicles (EV) and electric storage system (ESS), demands for higher capacity of lithium secondary batteries used as a power source thereof have increased.

Among various lithium secondary batteries, a lithium-sulfur battery is a battery system using a sulfur series material including sulfur-sulfur bonds as a positive electrode active material, and using lithium metal, a carbon-based material having lithium ion intercalation/deintercalation, or silicon, tin or the like forming an alloy with lithium as a negative electrode active material.

Sulfur, a main material of a positive electrode active material in a lithium-sulfur battery has advantages of having a low atomic weight, being readily supplied by being abundant in resources, being low priced, having no toxicity and being environmental-friendly.

In addition, a lithium-sulfur battery has theoretical discharge capacity, which is obtained from a conversion reaction of lithium ions and sulfur ($S_8+16Li^++16e^-\rightarrow 8Li_2S$) in a positive electrode, of up to 1,675 mAh/g, and, when using lithium metal (theoretical capacity: 3,860 mAh/g) as a negative electrode, has theoretical energy density of 2,600 Wh/kg. This is a very high number compared to theoretical energy density of other currently-studied battery systems (Ni-MH battery: 450 Wh/kg, Li—FeS battery: 480 Wh/kg, Li—MnO$_2$ battery: 1,000 Wh/kg, Na—S battery: 800 Wh/kg) and a lithium ion battery (250 Wh/kg), and therefore, among the secondary batteries that have been developed so far, a lithium-sulfur battery has received attention as a high capacity, environmental-friendly and low-cost lithium secondary battery, and various studies have been conducted thereon as a next generation battery system.

In such a lithium-sulfur battery, sulfur receives electrons to induce a reduction reaction in a positive electrode when discharged, and specifically, sulfur, a positive electrode active material, is finally reduced to lithium sulfide ($Li_2S$) through lithium polysulfide ($Li_2S_x$, x=8, 6, 4, 2).

However, lithium sulfide, a final product of a reduction reaction (discharge) of sulfur, is a material having low electric conductivity and is deposited on an electrode passivating a surface of the electrode on which the electrochemical reaction proceeds, and due to a decrease in electrochemical reactivity of the electrode caused therefrom, a problem of not fully achieving theoretical discharge capacity occurs in actual driving.

In addition, since the deposited lithium sulfide no longer participates in the electrochemical reaction, loss of the positive electrode active material occurs, which accelerates a decrease in the discharge capacity of a battery.

Due to such problems described above, capacity and charge and discharge efficiency properties rapidly decline as a cycle progresses in a lithium-sulfur battery, which also decreases the lifetime as well, and commercialization has not been successful since sufficient performance and driving stability are difficult to secure.

Most studies to resolve such problems are focused on reforming a positive electrode. Specifically, as one of methods to increase electric conductivity of the electrode, attempts to minimize a decrease in conductivity of the lithium sulfide-accumulated electrode by adding a conductive material made of carbon materials, or to control production and accumulation of intermediate products and lithium sulfide using a sulfur carrier having a nanostructure have been made.

However, most of the technologies are difficult to use commercially, and effects of improving capacity properties are not sufficient as well. Accordingly, development of a lithium-sulfur battery capable of obtaining excellent capacity properties by suppressing passivation of an electrode caused by lithium sulfide and a resulting decrease in electrochemical reactivity of the electrode has still been required.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

DISCLOSURE

Technical Problem

As a result of extensive studies in view of the above, the inventors of the present disclosure have identified that, when including a conjugated cyclic ether-based compound, dimethoxyethane and a glyme-based compound in an electrolyte for a lithium-sulfur battery as a non-aqueous organic solvent, discharge capacity of a battery can be enhanced by preventing passivation of an electrode caused by lithium sulfide, and have completed the present disclosure.

Accordingly, the present disclosure is directed to providing an electrolyte for a lithium-sulfur battery capable of exhibiting excellent capacity properties.

In addition, the present disclosure is also directed to providing a lithium-sulfur battery including the electrolyte.

Technical Solution

One embodiment of the present disclosure provides an electrolyte for a lithium-sulfur battery, the electrolyte including a lithium salt and a non-aqueous organic solvent, wherein the non-aqueous organic solvent includes a first solvent including a conjugated cyclic ether-based compound; a second solvent including dimethoxyethane; and a third solvent including a glyme-based compound represented by Chemical Formula 1:

$$R_1(CH_2CH_2O)_nR_2 \quad \text{[Chemical Formula 1]}$$

wherein in Chemical Formula 1, $R_1$, $R_2$, and n are as described in the specification.

In one embodiment of the present disclosure, a content of the first solvent may be from 20% by volume to 49% by volume, a content of the second solvent may be from 50% by volume to 79% by volume, and a content of the third solvent may be from greater than or equal to 1% by volume and less than 25% by volume based on 100% by volume of the non-aqueous organic solvent including the first solvent, the second solvent and the third solvent.

In one embodiment of the present disclosure, the conjugated cyclic ether-based compound may include a 4- to 15-membered heterocyclic compound including an oxygen atom or a sulfur atom while including two or more double bonds.

In one embodiment of the present disclosure, the conjugated cyclic ether-based compound may include one or more compounds selected from the group consisting of a furan-based compound and a thiophene-based compound.

In one embodiment of the present disclosure, the furan-based compound may include one or more compounds selected from the group consisting of furan, 2-methylfuran, 3-methylfuran, 2-ethylfuran, 2-propylfuran, 2-butylfuran, 2,3-dimethylfuran, 2,4-dimethylfuran, 2,5-dimethylfuran, pyran, 2-methylpyran, 3-methylpyran, 4-methylpyran, benzofuran and 2-(2-nitrovinyl) furan.

In one embodiment of the present disclosure, the thiophene-based compound may include one or more compounds selected from the group consisting of thiophene, 2-methylthiophene, 2-ethylthiophene, 2-propylthiophene, 2-butylthiophene, 2,3-dimethylthiophene, 2,4-dimethylthiophene and 2,5-dimethylthiophene.

In one embodiment of the present disclosure, the glyme-based compound may include one or more compounds selected from the group consisting of diethylene glycol dimethyl ether, diethylene glycol methyl ethyl ether, triethylene glycol dimethyl ether, triethylene glycol methyl ethyl ether, tetraethylene glycol dimethyl ether and tetraethylene glycol methyl ethyl ether.

Another embodiment of the present disclosure provides a lithium-sulfur battery including a positive electrode including a positive electrode active material; a negative electrode including a negative electrode active material; and the above-described electrolyte for a lithium-sulfur battery.

In one embodiment of the present disclosure, the positive electrode active material may include one or more types selected from the group consisting of inorganic sulfur, $Li_2S_n$ (n≥1), disulfide compounds, organosulfur compounds and carbon-sulfur polymers having a structure of $(C_2S_x)_m$, wherein x is a number of 2.5 to 50, and m≥2.

In one embodiment of the present disclosure, the negative electrode active material may include one or more types selected from the group consisting of lithium metal and lithium alloys.

Advantageous Effects

An electrolyte for a lithium-sulfur battery according to the present disclosure includes a non-aqueous organic solvent including specific three types of compounds, and suppresses passivation of an electrode caused by lithium sulfide and thereby suppresses a decrease in electrochemical reactivity of the electrode, and as a result, capacity properties of a lithium-sulfur battery can be improved, and stable lifetime properties can be secured.

DETAILED DESCRIPTION

Hereinafter, the present disclosure will be described in more detail.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

Terms used in the present disclosure are for describing specific embodiments only and do not intend to limit the present disclosure. Singular forms used herein include plural forms as well, unless the context clearly indicates otherwise. In the present disclosure, terms such as 'include' or 'have' are to specify the presence of features, numbers, steps, behaviors, constituents, components or combinations thereof described in the specification, and need to be construed as not excluding in advance the possibility of presence or addition of one or more of other features, numbers, steps, behaviors, constituents, components or combinations thereof.

The term "composite" used in the present specification means a material combining two or more materials, and exhibiting more effective functions while forming physically and chemically different phases.

The term "polysulfide" used in the present specification is a concept including both "polysulfide ion ($S_x^{2-}$, x=8, 6, 4, 2))" and "lithium polysulfide ($Li_2S_x$ or $LiS_x^-$ x=8, 6, 4, 2)".

A lithium-sulfur battery has high theoretical discharge capacity and energy density among various lithium secondary batteries, and has received attention as a next-generation secondary battery with advantages of sulfur used as a positive electrode active material being abundant in resources and low-priced lowering manufacturing costs of the battery, and being environmental-friendly.

As a lithium-sulfur battery is discharged, sulfur, a positive electrode active material, continuously reacts with lithium ions to be reduced to lithium sulfide ($Li_2S$), a final discharge product.

However, as described above, lithium sulfide is not dissolved in an electrolyte as well as having very low electric conductivity, and therefore, is adhered on an electrode surface, which leads to passivation of the electrode. As a result, electrochemical reactivity of the electrode is reduced and the amount of sulfur participating in the electrochemical reaction is reduced as well making it impossible to obtain theoretical discharge capacity, and there is also a problem of having low battery lifetime properties due to deterioration of capacity properties as the cycle progresses.

In view of the above, methods such as changing compositions of a positive electrode or electrolyte, using an additive, and the like, have been used in the art, however, they are not preferred for practical application since, as well as having an insignificant effect in suppressing passivation caused by lithium sulfide, serious problems in battery performance and driving stability are caused due to a compatibility problem with other elements forming the battery.

Accordingly, the present disclosure provides an electrolyte for a lithium-sulfur battery capable of obtaining a lithium-sulfur battery with enhanced capacity and lifetime properties by specifying a solvent as a three-component system in the electrolyte used in the lithium-sulfur battery to increase solubility for lithium sulfide, and thereby delaying passivation and a decrease in the electrochemical reactivity.

Specifically, the electrolyte for a lithium-sulfur battery according to the present disclosure includes a lithium salt and a non-aqueous organic solvent, and the non-aqueous organic solvent includes a first solvent including a conjugated cyclic ether-based compound; a second solvent including dimethoxyethane; and a third solvent including a glyme-based compound represented by the following Chemical Formula 1:

  [Chemical Formula 1]

in Chemical Formula 1, $R_1$ and $R_2$ are the same as or different from each other, and each independently an alkyl group or alkoxy group having 1 to 10 carbon atoms, and n is an integer of 2 to 4.

The term "alkyl group" used in the present specification means a linear or branched saturated hydrocarbon group, and although not particularly limited thereto, the number of carbon atoms is preferably from 1 to 10. Specific examples thereof may include a methyl group, an ethyl group, a propyl group, an isopropyl group, a butyl group, a t-butyl group, a pentyl group, a hexyl group, a heptyl group and the like, but are not limited thereto.

The term "alkoxy group" used in the present specification means an alkyl group to which an oxygen radical is attached, and although not particularly limited thereto, the number of carbon atoms is preferably from 1 to 10. Specific examples thereof may include a methoxy group, an ethoxy group, a propoxy group, an isopropoxy group, a butoxy group, an isobutoxy group, a t-butoxy group, a pentoxy group, an isopentoxy group, a hexoxy group and the like, but are not limited thereto.

One or more hydrogen atoms included in the alkyl group or the alkoxy group may be optionally substituted with one or more substituents (for example, alkyl, alkenyl, alkynyl, heterocyclic, aryl, heteroaryl, acyl, oxo, imino, thiooxo, cyano, isocyano, amino, azido, nitro, hydroxyl, thiol, halogen and the like). The halogen is a generic term for fluoro, chloro, bromo and iodo.

Lithium sulfide, a discharge product of a positive electrode in a lithium-sulfur battery, is a nonconductor, and deposited on an electrode, particularly, an electrode surface including a carbon material to quickly passivate the electrode surface causing passivation of the electrode. However, the electrolyte according to the present disclosure includes a first solvent including a conjugated cyclic ether-based compound; a second solvent including dimethoxyethane; and a third solvent including the glyme-based compound represented by Chemical Formula 1 as a non-aqueous organic solvent, and may suppress passivation of an electrode by dissolving lithium sulfide present on the electrode surface. Accordingly, an active surface area of the electrode in which an electrochemical reaction progresses may be maintained, and loss of sulfur, a positive electrode active material, does not occur, and as a result, the lithium-sulfur battery may exhibit excellent lifetime properties as well as obtaining an excellent capacity rate compared to theoretical discharge capacity of a lithium-sulfur battery.

First Solvent

In the present disclosure, the first solvent including a conjugated cyclic ether-based compound includes a 4- to 15-membered heterocyclic compound including an oxygen atom or a sulfur atom while including two or more double bonds.

The conjugated cyclic ether-based compound forms a polymer protective film (solid electrolyte interface, SEI layer) on a negative electrode surface including lithium metal by a ring opening reaction of the heterocyclic compound in an initial discharge stage of a battery, which suppresses a side reaction between lithium polysulfide produced and eluted from a positive electrode and the lithium metal, and prevents lithium sulfide from being adhered on the lithium metal surface and loss of a positive electrode active material resulting therefrom. In addition, delocalization of lone pair electrons of the heteroatom (oxygen atom or sulfur atom) makes it difficult to dissolve a salt, which performs a role of reducing the eluted amount of lithium polysulfide.

In other words, the conjugated cyclic ether-based compound used as the first solvent of the present disclosure needs to include two or more double bonds in order to form a polymer protective film on a negative electrode surface including lithium metal, and needs to include a heteroatom (oxygen atom or sulfur atom) in order to have polarity and have effects such as increasing affinity with other compositions in the electrolyte.

The conjugated cyclic ether-based compound may be a 4- to 15-membered, preferably 4- to 7-membered and more preferably 5- to 6-membered heterocyclic compound.

In addition, the conjugated cyclic ether-based compound may be a heterocyclic compound unsubstituted or substituted with one or more types selected from the group consisting of an alkyl group having 1 to 4 carbon atoms, a cyclic alkyl group having 3 to 8 carbon atoms, an aryl group having 6 to 10 carbon atoms, a halogen group, a nitro group ($-NO_2$), an amine group ($-NH_2$) and a sulfonyl group ($-SO_2$); or a polycyclic compound of the heterocyclic compound and one or more types selected from the group consisting of a cyclic alkyl group having 3 to 8 carbon atoms and an aryl group having 6 to 10 carbon atoms.

The conjugated heterocyclic compound being substituted with an alkyl group having 1 to 4 carbon atoms is preferred since radicals are stabilized suppressing a side reaction between the electrolyte and other components forming a battery. In addition, the conjugated heterocyclic compound being substituted with a halogen group or a nitro group is preferred since a functional protective film may be formed on a negative electrode surface including lithium metal, and herein, the formed functional protective film has advantages of being stable and uniformly deposited as a compact-type protective film.

The conjugated cyclic ether-based compound may include one or more types selected from the group consisting of a furan-based compound and a thiophene-based compound.

Specific examples of the furan-based compound may include one or more types selected from the group consisting of furan, 2-methylfuran, 3-methylfuran, 2-ethylfuran, 2-propylfuran, 2-butylfuran, 2,3-dimethylfuran, 2,4-dimethylfuran, 2,5-dimethylfuran, pyran, 2-methylpyran, 3-methylpyran, 4-methylpyran, benzofuran and 2-(2-nitrovinyl)furan. Preferably, one or more types selected from the group consisting of 2-methylfuran and 2,5-dimethylfuran may be included.

Specific examples of the thiophene-based compound may include one or more types selected from the group consisting of thiophene, 2-methylthiophene, 2-ethylthiophene, 2-propylthiophene, 2-butylthiophene, 2,3-dimethylthiophene, 2,4-dimethylthiophene and 2,5-dimethylthiophene.

Second Solvent

In the present disclosure, the second solvent including dimethoxyethane (DME; (mono)glyme) performs a role of securing an ion transfer ability of the electrolyte by favorably dissolving a lithium salt and maintaining viscosity of the electrolyte low.

Third Solvent

In the present disclosure, the third solvent including the glyme-based compound represented by Chemical Formula 1 performs a role of dissolving a lithium salt so that the electrolyte has lithium ion conductivity, and also performs a role of dissolving lithium sulfide. The glyme-based compound of Chemical Formula 1 includes two or more —($CH_2CH_2O$)— structures lowering solvation energy of lithium sulfide, and therefore, has high solubility for lithium sulfide compared to the second solvent including dimethoxyethane, a monoglyme, described above. The glyme-based compound represented by Chemical Formula 1 prevents passivation of an electrode by dissolving lithium sulfide produced by battery discharge and maintains electrochemical reactivity of the electrode, and as a result, capacity and lifetime properties of a lithium-sulfur battery may be enhanced. In addition, as loss of sulfur, a positive electrode active material, does not occur, obtained capacity of the positive electrode active material may be maximized.

In Chemical Formula 1, $R_1$ and $R_2$ are the same as or different from each other, and preferably each independently an alkyl group or alkoxy group having 1 to 5 carbon atoms.

Specific examples of the glyme-based compound may include one or more types selected from the group consisting of diethylene glycol dimethyl ether (diglyme), diethylene glycol ethyl methyl ether, triethylene glycol dimethyl ether (triglyme), triethylene glycol ethyl methyl ether, tetraethylene glycol dimethyl ether (tetraglyme) and tetraethylene glycol ethyl methyl ether. Preferably, one or more types selected from the group consisting of diethylene glycol dimethyl ether, triethylene glycol dimethyl ether and tetraethylene glycol dimethyl ether may be included, and more preferably, one or more types selected from the group consisting of diethylene glycol dimethyl ether and triethylene glycol dimethyl ether may be included.

The electrolyte for a lithium-sulfur battery of the present disclosure includes the first solvent, the second solvent and the third solvent as described above, and as for each content thereof, a content of the first solvent is from 20% by volume to 49% by volume, a content of the second solvent is from 50% by volume to 79% by volume, and a content of the third solvent is greater than or equal to 1% by volume and less than 25% by volume based on 100% by volume of the non-aqueous organic solvent including the first solvent, the second solvent and the third solvent.

The content of the first solvent is preferably from 20% by volume to 35% by volume based on 100% by volume of the non-aqueous organic solvent included in the electrolyte for a lithium-sulfur battery of the present disclosure. When the first solvent content is less than 20% by volume, a protective film may not be perfectly formed on a negative electrode surface causing a problem of failing to suppress lithium sulfide production or reducing an effect of suppressing lithium polysulfide elution. When the first solvent content is greater than 49% by volume on the contrary, lithium polysulfide elution is excessively prevented and an electrochemical reaction may not proceed normally, which may lead to a problem of reducing discharge capacity of a battery.

The content of the second solvent is preferably from 55% by volume to 75% by volume based on 100% by volume of the non-aqueous organic solvent included in the electrolyte for a lithium-sulfur battery of the present disclosure. When the second solvent content is less than 50% by volume, viscosity of the electrolyte increases declining battery performance, and when the second solvent content is greater than 79% by volume on the contrary, lithium polysulfide elution increases reducing a cyclic life of a battery.

The content of the third solvent is preferably from 5% by volume to 20% by volume based on 100% by volume of the non-aqueous organic solvent included in the electrolyte for a lithium-sulfur battery of the present disclosure. When the third solvent content is less than 1% by volume, the amount of increase in the lithium sulfide solubility is small resulting in an insignificant improvement in the capacity. When the third solvent content is 25% by volume or greater on the contrary, an effect of improving capacity properties may be insignificant due to an increase in the viscosity of the electrolyte.

Lithium Salt

The electrolyte for a lithium-sulfur battery according to the present disclosure includes a lithium salt as an electrolyte salt. The lithium salt may be used without limit as long as it may be commonly used in a lithium secondary battery.

Specific examples of the lithium salt may be one or more selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiC_4BO_8$, $LiAsF_6$, $LiSbF_6$, $LiAlCl_4$, $LiSO_3CH_3$, $LiSO_3CF_3$, LiSCN, $LiC(CF_3SO_2)_3$, $LiN(CF_3SO_2)_2$ (lithium bis(trifluoromethanesulfonyl)imide; LiTFSI), $LiN(C_2F_5SO_2)$ $LiN(SO_2F)_2$ (lithium bis(fluorosulfonyl)imide; LiFSI), lithium nitrate ($LiNO_3$), lithium nitrite ($LiNO_2$), chloroborane lithium, lower aliphatic carboxylic acid lithium, lithium tetraphenylborate and lithium imide. The lithium salt preferably includes $LiN(SO_2F)_2$ (LiFSI) as an essential component, and more preferably includes lithium nitrate therewith as necessary.

A concentration of the lithium salt may be properly determined considering ion conductivity, solubility or the like of the lithium salt, and for example, the concentration may be from 0.1 M to 4.0 M, preferably from 0.2 M to 2.0 M and more preferably from 0.5 M to 2.0 M. When the lithium salt concentration is less than the above-mentioned range, ion conductivity suitable for battery driving is difficult to secure, and when the lithium salt concentration is greater than the above-mentioned range on the contrary, viscosity of the electrolyte liquid increases reducing mobility of lithium ions and battery performance may decline by increasing a decomposition reaction of the lithium salt itself, and therefore, the concentration is properly adjusted in the above-mentioned range.

The electrolyte for a lithium-sulfur battery according to the present disclosure may include an additive commonly used in the art in addition to the above-described compositions for the purpose of enhancing the function.

For example, the additive may be one or more types selected from the group consisting of lanthanum nitrate ($La(NO_3)_3$), potassium nitrate ($KNO_3$), cesium nitrate ($CsNO_3$), magnesium nitrate ($Mg(NO_3)_2$), barium nitrate ($Ba(NO_3)_2$), potassium nitrite ($KNO_2$) and cesium nitrite ($CsNO_2$). In addition, the additive may be included in 1% by weight to 10% by weight, preferably in 2% by weight to 8% by weight and more preferably in 2.5% by weight to 6% by weight based on 100% by weight of the electrolyte for a lithium-sulfur battery. When the additive content is less than the above-mentioned range, Coulombic efficiency may rapidly decrease, and when the content is greater than the above-mentioned range, viscosity of the electrolyte increases making driving difficult.

In addition, the present disclosure provides a lithium-sulfur battery including the electrolyte for a lithium-sulfur battery.

The lithium-sulfur battery includes a positive electrode; a negative electrode; and an electrolyte provided therebetween, and as the electrolyte, the electrolyte for a lithium-sulfur battery according to the present disclosure is included.

The positive electrode may include a positive electrode current collector, and a positive electrode active material layer coated on one surface or both surfaces of the positive electrode current collector.

The positive electrode current collector is not particularly limited as long as it supports a positive electrode active material, and has high conductivity without inducing chemical changes to the corresponding battery. For example, copper, stainless steel, aluminum, nickel, titanium, palladium, baked carbon, copper or stainless steel of which surface is treated with carbon, nickel, silver or the like, aluminum-cadmium alloys and the like may be used.

The positive electrode current collector may strengthen binding strength with the positive electrode active material by forming micro unevenness on a surface thereof, and various forms such as films, sheets, foil, meshes, nets, porous bodies, foams or non-woven fabrics may be used.

The positive electrode active material layer includes a positive electrode active material, and may further include a conductive material, a binder, an additive and the like.

The positive electrode active material includes sulfur, and specifically, may include one or more tyles selected from the group consisting of elemental sulfur ($S_8$) and sulfur compounds. The positive electrode active material may include one or more types selected from the group consisting of inorganic sulfur, $Li_2S_n$ ($n \geq 1$), disulfide compounds, organosulfur compounds and carbon-sulfur polymers (($C_2S_x)_n$, x=2.5 to 50, n≥2). Preferably, the positive electrode active material may be inorganic sulfur.

The sulfur included in the positive electrode active material does not have electric conductivity alone, and therefore, is composited with a conductive material such as a carbon material. Accordingly, the sulfur is included in the form of a sulfur-carbon composite, and preferably, the positive electrode active material may be a sulfur-carbon composite.

The carbon included in the sulfur-carbon composite is a porous carbon material and provides a skeleton capable of uniformly and stably fixing the sulfur, and allows an electrochemical reaction to smoothly progress by supplementing low electric conductivity of the sulfur.

The porous carbon material may be generally prepared by carbonizing a precursor made of various carbon materials. The porous carbon material includes pores that are not constant on the inside. The pores have an average diameter in a range of 1 nm to 200 nm, and the porosity may be in a range of 10% to 90% of a total volume of the porous carbon material. When the pores have an average diameter of less than the above-mentioned range, the pore size is merely a molecular level making sulfur impregnation impossible, and when the pores have an average diameter of greater than the above-mentioned range, the porous carbon material has weakened mechanical strength, which is not preferred to be used in an electrode preparation process.

The form of the porous carbon material may be a globular type, a rod type, a needle type, a plate type, a tube type or a bulk type, and may be used without limit as long as it is commonly used in a lithium-sulfur battery.

As the porous carbon material, any material commonly used in the art may be used as long as it has a porous structure or has a high specific surface area. For example, the porous carbon material may be one or more types selected from the group consisting of graphite; graphene; carbon black such as denka black, acetylene black, ketjen black, channel black, furnace black, lamp black or thermal black; carbon nanotubes (CNT) such as single-walled carbon nanotubes (SWCNT) or multi-walled carbon nanotubes (MWCNT); carbon fibers such as graphite nanofibers (GNF), carbon nanofibers (CNF) or activated carbon fibers (ACF); graphite such as natural graphite, artificial graphite or expanded graphite, and activated carbon, but is not limited thereto. Preferably, the porous carbon material may be carbon nanotubes.

The sulfur-carbon composite may include the sulfur in 60 parts by weight to 90 parts by weight, preferably in 65 parts by weight to 85 parts by weight and more preferably in 70 parts by weight to 80 parts by weight based on 100 parts by weight of the sulfur-carbon composite. When the sulfur content is less than the above-mentioned range, the content of the porous carbon material relatively increases in the sulfur-carbon composite, which increases a specific surface area and increases a binder content when preparing the positive electrode. Such an increase in the binder amount used resultantly increases sheet resistance of the positive electrode performing a role of an insulator preventing electron migration (electron pass), and battery performance may decline. When the sulfur content is greater than above-described range on the contrary, the sulfurs not bonding to the porous carbon material aggregate by themselves or are re-eluted to the surface of the porous carbon material making it difficult to receive electrons, and loss in the capacity of a battery may occur since participation in an electrochemical reaction becomes not possible.

In addition, in the sulfur-carbon composite, the sulfur is located on at least any one of inner and outer surfaces of the porous carbon material described above, and herein, may be present in a region of less than 100%, preferably 1% to 95% and more preferably 60% to 90% of the whole inner and outer surface of the porous carbon material. When the sulfur is present on the inner and outer surfaces of the porous carbon material in the above-mentioned range, maximum effects may be obtained in terms of electron transfer area and wettability with the electrolyte. Specifically, the sulfur is thinly and evenly impregnated on the inner and outer surfaces of the porous carbon material surface in the above-mentioned range, and therefore, an electron transfer contact area may increase in a charge and discharge process. When the sulfur is located in a 100% region of the whole inner and outer surface of the porous carbon material, the carbon material is completely covered with the sulfur reducing wettability for the electrolyte, and reducing a contact with a conductive material included in the electrode, and as a result, electrons are not transferred and participation in an electrochemical reaction becomes impossible.

A method for preparing the sulfur-carbon composite is not particularly limited, and methods commonly used in the art may be used. As one example, a method of compositing through simply mixing the sulfur and the porous carbon material, and then heat treating the mixture may be used.

The positive electrode active material may further include, in addition to the compositions described above, one or more additives selected from among transition metal elements, group IIIA elements, group IVA elements, sulfur compounds of these elements, and alloys of these elements and sulfur.

As the transition metal element, Sc, Ti, V, Cr, Mn, Fe, Co, Ni, Cu, Zn, Y, Zr, Nb, Mo, Tc, Ru, Rh, Pd, Os, Ir, Pt, Au, Hg or the like may be included. As the group IIIA element, Al, Ga, In, Ti or the like may be included, and as the group IVA element, Ge, Sn, Pb or the like may be included.

The positive electrode active material may be included in 40% by weight to 95% by weight, preferably in 45% by weight to 90% by weight and more preferably in 60% by weight to 90% by weight based on 100% by weight of the positive electrode active material layer forming the positive electrode. When the positive electrode active material content is less than the above-mentioned range, it is difficult to sufficiently conduct an electrochemical reaction of the positive electrode, and when the positive electrode active material content is greater than the above-mentioned range on the contrary, a content of a conductive material and a content of a binder to describe later are relatively insufficient increasing resistance of the positive electrode, and a problem of declining physical properties of the positive electrode occurs.

The positive electrode active material layer may optionally further include a conductive material for electrons to smoothly migrate in the positive electrode (specifically, positive electrode active material) and a binder for fully attaching the positive electrode active material to the current collector.

The conductive material is a material electrically connecting the electrolyte and the positive electrode active material to perform a role of a path through which electrons migrate from the current collector to the positive electrode active material, and may be used without limit as long as it has conductivity.

For example, as the conductive material, graphite such as natural graphite or artificial graphite; carbon black such as Super-P, denka black, acetylene black, ketjen black, channel black, furnace black, lamp black or thermal black; carbon derivatives such as carbon nanotubes or fullerene; conductive fibers such as carbon fiber or metal fibers; fluorocarbon; metal powders such as aluminum powder, nickel powder, or conductive polymers such as polyaniline, polythiophene, polyacetylene or polypyrrole may be used either alone or as a mixture.

The conductive material may be included in 1% by weight to 10% by weight and preferably in 4% by weight to 7% by weight based on 100% by weight of the positive electrode active material layer forming the positive electrode. When the conductive material content is less than the above-mentioned range, electron transfer between the positive electrode active material and the current collector does not readily occur reducing voltage and capacity. When the conductive material content is greater than the above-mentioned range on the contrary, the ratio of the positive electrode active material relatively decreases, which may reduce total energy (charge quantity) of a battery, and therefore, a proper content is preferably determined in the above-mentioned range.

The binder is for keeping the positive electrode active material on the positive electrode current collector, and organically linking the positive electrode active materials to further increase binding force between them, and all binders known in the art may be used.

Example of the binder may include one type selected from the group consisting of fluorine resin-based binders including polyvinylidene fluoride (PVdF) or polytetrafluoroethylene (PTFE); rubber-based binders including styrene butadiene rubber (SBR), acrylonitrile-butadiene rubber or styrene-isoprene rubber; cellulose-based binders including carboxyl methyl cellulose (CMC), starch, hydroxypropyl cellulose or regenerated cellulose; polyalcohol-based binders; polyolefin-based binders including polyethylene or polypropylene; polyimide-based binders; polyester-based binders; and silane-based binders, or mixtures or copolymers of two or more types thereof.

The binder content may be from 1% by weight to 10% by weight based on 100% by weight of the positive electrode active material layer forming the positive electrode. When the binder content is less than the above-mentioned range, physical properties of the positive electrode decline and the positive electrode active material and the conductive material may be eliminated, and when the binder content is greater than the above-mentioned range, the ratios of the positive electrode active material and the conductive material relatively decrease in the positive electrode, which may reduce battery capacity, and therefore, a proper content is preferably determined in the above-mentioned range.

A method for preparing the positive electrode is not particularly limited in the present disclosure, and known methods or various methods of modifying known methods by those skilled in the art may be used.

As one example, the positive electrode may be prepared by preparing a positive electrode slurry composition including the above-described compositions, and coating the slurry composition on at least one surface of the positive electrode current collector.

The positive electrode slurry composition includes the positive electrode active material, the conductive material and the binder described above, and may further include a solvent.

As the solvent, those capable of uniformly dispersing the positive electrode active material, the conductive material and the binder are used. As such a solvent, water is most preferred as an aqueous solvent, and the water herein may be distilled water or deionized water. However, the solvent is not limited thereto, and a lower alcohol that may be readily mixed with water may be used as necessary. Examples of the lower alcohol may include methanol, ethanol, propanol, isopropanol, butanol and the like, and preferably, these may be mixed with water and used.

The solvent may be included at a level having a concentration capable of facilitating coating, and the specific content may vary depending on coating method and device.

The positive electrode slurry composition may further include materials commonly used in the art as necessary with the purpose of enhancing the function in the corresponding technical field. For example, a viscosity modifier, a fluidizing agent, a filler and the like may be included.

A method of coating the positive electrode slurry composition is not particularly limited in the present disclosure, and for example, methods such as doctor blade, die casting, comma coating and screen printing may be included. In addition, after forming on a separate substrate, the positive electrode slurry may also be coated on the positive electrode current collector using a method of pressing or lamination.

After the coating, a drying process for removing the solvent may be conducted. The drying process is conducted under temperature and time at a level sufficiently removing the solvent, and the condition is not particularly limited in the present disclosure since it may vary depending on the solvent type. As one example, a drying method of drying by warm air, hot air or low-humidity air, vacuum drying, irradiation of (far)infrared rays, electron beam and the like, may be included. The drying rate is usually adjusted so that the solvent is removed as quickly as possible in a rate range not to cause cracks on the positive electrode active material layer by stress concentration or not to peel off the positive electrode active material layer from the positive electrode current collector.

Additionally, density of the positive electrode active material in the positive electrode may also increase by pressing the current collector after the drying. As a method of the pressing, methods such as mold press and roll press may be included.

The positive electrode, specifically, the positive electrode active material layer, prepared using the compositions and the preparation method described above may have porosity of 40% to 80% and preferably 60% to 75%. When the porosity of the positive electrode is less than 40%, the degree of filling of the positive electrode slurry composition including the positive electrode active material, the conductive material and the binder excessively increases, and accordingly, an electrolyte sufficient to obtain ion conduction and/or electric conduction between the positive electrode active materials may not be maintained declining output properties or cycle properties of a battery, and problems of battery overvoltage and severe reduction in the discharge capacity occur. When the positive electrode has porosity of greater than 80% and has excessively high porosity on the contrary, physical and electrical connections with the current collector decrease causing problems of reducing adhesive strength and making reaction difficult, and a problem of reducing energy density by filling the increased pores with the electrolyte may also occur, and therefore, the porosity is properly adjusted in the above-mentioned range.

In addition, the sulfur loading amount in the positive electrode according to the present disclosure, that is, the mass of sulfur per unit area of the positive electrode active material layer in the positive electrode, may be from 2 $mg/cm^2$ to 15 $mg/cm^2$ and preferably from 2.5 $mg/cm^2$ to 5 $mg/cm^2$.

The negative electrode may include a negative electrode current collector, and a negative electrode active material layer coated on one surface or both surfaces of the negative electrode current collector. Alternatively, the negative electrode may be a lithium metal plate.

The negative electrode current collector is for supporting the negative electrode active material layer, and descriptions thereon are the same as the descriptions on the positive electrode current collector.

The negative electrode active material layer may include a conductive material, a binder and the like in addition to the negative electrode active material. Herein, descriptions the conductive material and the binder are the same as the descriptions provided above.

As the negative electrode active material, materials capable of reversibly intercalating or deintercalating lithium (Lit), materials capable of reversibly forming a lithium-containing compound by reacting with lithium ions, lithium metal or lithium alloys may be included.

Examples of the material capable of reversibly intercalating or deintercalating lithium ions (Lit) may include crystalline carbon, amorphous carbon or a mixture thereof. Examples of the material capable of reversibly forming a lithium-containing compound by reacting with lithium ions (Lit) may include tin oxide, titanium nitrate or silicon. Examples of the lithium alloy may include alloys of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al) and tin (Sn).

Preferably, the negative electrode active material may be lithium metal, and specifically, may have a lithium metal thin film or lithium metal powder form.

A method of forming the negative electrode active material is not particularly limited, and methods of forming a layer or film commonly used in the art may be used. For example, methods such as pressing, coating and deposition may be used. In addition, a case of assembling a battery without a lithium thin film in a current collector and then forming a metal lithium thin film on the metal plate by initial charge is also included in the negative electrode of the present disclosure.

The electrolyte is for producing an electrochemical oxidation or reduction reaction in the positive electrode and the negative electrode therethrough, and the descriptions provided above may be applied thereon.

The electrolyte may be injected at a proper stage in a lithium-sulfur battery manufacturing process depending on a manufacturing process and required properties of a final product. In other words, the electrolyte may be injected at a stage prior to assembling a lithium-sulfur battery or at a final stage of the assembly.

A separator may be further included between the positive electrode and the negative electrode.

The separator separates or insulates the positive electrode and the negative electrode from each other, and enables lithium ion transfer between the positive electrode and the negative electrode, and may be formed with porous non-conductive or insulating materials. The separator may be used without particular limit as long as it is commonly used as a separator in a lithium-sulfur battery. The separator may be an independent member such as a film, or a coating layer added to a positive electrode and/or a negative electrode.

As the separator, those having an excellent moisture-containing ability for the electrolyte while having low resistance for ion migration of the electrolyte are preferred.

The separator may be formed with a porous base, and as the porous base, porous bases commonly used in a lithium-sulfur battery may all be used, and the porous polymer film may be used either alone or as a laminate thereof. For example, non-woven fabrics or polyolefin-based porous films made of high melting point glass fiber, polyethylene terephthalate and the like may be used, however, the separator is not limited thereto.

Materials of the porous base are not particularly limited in the present disclosure, porous bases commonly used in a lithium-sulfur battery may all be used. For example, the porous base may include one or more types of materials selected from the group consisting of polyolefins such as polyethylene and polypropylene, polyesters such as polyethylene terephthalate and polybutylene terephthalate, polyamide, polyacetal, polycarbonate, polyimide, polyetheretherketone, polyethersulfone, polyphenylene oxide, polyphenylene sulfide, polyethylene naphthalate, polytetrafluoroethylene, polyvinylidene fluoride, polyvinyl chloride, polyacrylonitrile, cellulose, nylon, poly(p-phenylene benzobisoxazole) and polyarylate.

A thickness of the porous base is not particularly limited, but may from 1 μm to 100 μm and preferably from 5 μm to 50 μm. The porous base thickness range is not limited to the range described above, however, when the thickness is excessively thinner than the lower limit described above, mechanical properties decline, and the separator may be readily damaged during battery use.

Average diameter and porosity of the pores present in the porous base are not particularly limited as well, but may respectively be from 0.001 μm to 50 μm and from 10% to 95%.

The lithium-sulfur battery according to the present disclosure may go through lamination (stack) and folding processes of the separator and the electrode in addition to winding, a general process.

The shape of the lithium-sulfur battery is not particularly limited, and may employ various shapes such as a cylinder-type, a lamination-type or a coin-type.

In addition, the present disclosure provides a battery module including the lithium-sulfur battery as a unit cell.

The battery module may be used as a power supply of medium to large-sized devices requiring high-temperature stability, long cycle properties and high capacity properties.

Examples of the medium to large-sized device may include power tools operated through receiving electric power by a battery motor; electric vehicles including electric vehicles (EV), hybrid electric vehicles (HEV), plug-in hybrid electric vehicles (PHEV) and the like; electric two-wheeled vehicles including electric bikes (E-bikes) and electric scooters (E-scooters); electric golf carts; electric storage systems, and the like, but are not limited thereto.

Hereinafter, preferred examples will be provided in order to illuminate the present disclosure, however, the following examples are for illustrative purposes only, and it will be obvious to those skilled in the art that various changes and modifications may be made within the category and technical ideas of the present disclosure, and such changes and modifications also fall within the scope of the attached claims.

EXAMPLES AND COMPARATIVE EXAMPLES

Example 1

(1) Preparation of Electrolyte

In an organic solvent obtained by mixing 2-methylfuran (first solvent), dimethoxyethane (second solvent) and diethylene glycol dimethyl ether (third solvent) in a volume ratio of 20:75:5, LiFSI was dissolved as to have a concentration of 0.75 M, and then 3% by weight of lithium nitrate based on a total electrolyte weight was added thereto to prepare an electrolyte for a lithium-sulfur battery.

(2) Manufacture of Lithium-Sulfur Battery

Sulfur and carbon nanotubes were evenly mixed in a weight ratio of 70:30 using a ball mill, and then heat treated for 30 minutes at a temperature of 155° C. to prepare a sulfur-carbon composite.

90% by weight of the prepared sulfur-carbon composite, 5% by weight of denka black as a conductive material and 5% by weight of styrene-butadiene rubber/carboxyl methyl cellulose (SBR:CMC=7:3, weight ratio) as a binder were mixed to prepare a positive electrode slurry composition.

The positive electrode slurry composition prepared as above was coated on a current collector (aluminum foil) having a thickness of 20 μm, dried for 12 hours at 50° C., and then pressed using a roll press device to prepare a positive electrode. Herein, energy density of the positive electrode was 5 mAh/cm$^2$, and porosity was 65%.

The prepared positive electrode and a lithium metal negative electrode having a thickness of 150 μm were placed to face each other, and after providing a separator therebetween, the electrolyte prepared in (1) was injected to manufacture a coin cell-type lithium-sulfur battery. Herein, polyethylene having a thickness of 20 μm and porosity of 45% was used as the separator of 19 phi, and the positive electrode was punched as a circular electrode of 14 phi and the negative electrode was punched as a circular electrode of 16 phi to be used.

Example 2

A lithium-sulfur battery was manufactured in the same manner as in Example 1 except that, when preparing the electrolyte, the volume ratio of the 2-methylfuran (first solvent), the dimethoxyethane (second solvent) and the diethylene glycol dimethyl ether (third solvent) was changed from 20:75:5 to 20:70:10.

Example 3

A lithium-sulfur battery was manufactured in the same manner as in Example 1 except that, when preparing the electrolyte, the volume ratio of the 2-methylfuran (first solvent), the dimethoxyethane (second solvent) and the diethylene glycol dimethyl ether (third solvent) was changed from 20:75:5 to 20:60:20.

Example 4

A lithium-sulfur battery was manufactured in the same manner as in Example 1 except that, when preparing the electrolyte, the third solvent was changed from diethylene glycol dimethyl ether to triethylene glycol dimethyl ether.

Example 5

A lithium-sulfur battery was manufactured in the same manner as in Example 1 except that, when preparing the electrolyte, the third solvent was changed from diethylene glycol dimethyl ether to triethylene glycol dimethyl ether, and the volume ratio of the first solvent, the second solvent and the third solvent was changed from 20:75:5 to 20:70:10.

Example 6

A lithium-sulfur battery was manufactured in the same manner as in Example 1 except that, when preparing the electrolyte, the third solvent was changed from diethylene glycol dimethyl ether to triethylene glycol dimethyl ether, and the volume ratio of the first solvent, the second solvent and the third solvent was changed from 20:75:5 to 20:60:20.

Comparative Example 1

A lithium-sulfur battery was manufactured in the same manner as in Example 1 except that, when preparing the electrolyte, the third solvent was not used, and an organic solvent obtained by mixing only 2-methylfuran (first solvent) and dimethoxyethane (second solvent) in a volume ratio of 20:80 was used.

Comparative Example 2

A lithium-sulfur battery was manufactured in the same manner as in Example 1 except that, when preparing the electrolyte, the volume ratio of the 2-methylfuran (first solvent), the dimethoxyethane (second solvent) and the diethylene glycol dimethyl ether (third solvent) was changed from 20:75:5 to 20:50:30.

Comparative Example 3

A lithium-sulfur battery was manufactured in the same manner as in Example 1 except that, when preparing the electrolyte, the third solvent was changed from diethylene glycol dimethyl ether to triethylene glycol dimethyl ether, and the volume ratio of the first solvent, the second solvent and the third solvent was changed from 20:75:5 to 20:50:30.

Comparative Example 4

A lithium-sulfur battery was manufactured in the same manner as in Example 1 except that, when preparing the electrolyte, the volume ratio of the 2-methylfuran (first solvent), the dimethoxyethane (second solvent) and the diethylene glycol dimethyl ether (third solvent) was changed from 20:75:5 to 10:80:10.

Comparative Example 5

A lithium-sulfur battery was manufactured in the same manner as in Example 1 except that, when preparing the electrolyte, the third solvent was changed from diethylene glycol dimethyl ether to triethylene glycol dimethyl ether, and the volume ratio of the first solvent, the second solvent and the third solvent was changed from 20:75:5 to 10:80:10.

Comparative Example 6

A lithium-sulfur battery was manufactured in the same manner as in Example 1 except that, when preparing the electrolyte, the first solvent was changed from 2-methylfuran to 1,3-dioxolane.

The compositions of the electrolytes used in the examples and the comparative examples are summarized and shown in the following Table 1.

TABLE 1

| | Electrolyte | | | | | |
|---|---|---|---|---|---|---|
| | First Solvent | | Second | Third Solvent | | Lithium Salt | |
| | | | | Diethylene Glycol | Triethylene Glycol | | |
| | 2-Methylfuran (% by Volume) | 1,3-Dioxolane (% by Volume) | Solvent Dimethoxyethane (% by Volume) | Dimethyl Ether (% by Volume) | Dimethyl Ether (% by Volume) | LiFSI (M) | Lithium Nitrate (% by Weight) |
| Example 1 | 20 | — | 75 | 5 | — | 0.75 | 3 |
| Example 2 | 20 | — | 70 | 10 | — | 0.75 | 3 |
| Example 3 | 20 | — | 60 | 20 | — | 0.75 | 3 |
| Example 4 | 20 | — | 75 | — | 5 | 0.75 | 3 |
| Example 5 | 20 | — | 70 | — | 10 | 0.75 | 3 |
| Example 6 | 20 | — | 60 | — | 20 | 0.75 | 3 |
| Comparative Example 1 | 20 | — | 80 | — | — | 0.75 | 3 |
| Comparative Example 2 | 20 | — | 50 | 30 | — | 0.75 | 3 |
| Comparative Example 3 | 20 | — | 50 | — | 30 | 0.75 | 3 |
| Comparative Example 4 | 10 | — | 80 | 10 | — | 0.75 | 3 |
| Comparative Example 5 | 10 | — | 80 | — | 10 | 0.75 | 3 |
| Comparative Example 6 | — | 20 | 75 | 5 | — | 0.75 | 3 |

Experimental Example 1. Evaluation of Battery Performance

Each of the batteries manufactured in the examples and the comparative examples was charged and discharged for initial 3 cycles with 0.1 C at 25° C., and discharge capacity was measured. After that, charge with 0.2 C and discharge with 0.3 C were repeated to measure a cycle life. Herein, the voltage range used was from 1.8 V to 2.5 V (that is, discharge to 1.8 V, and charge to 2.5 V), and the obtained results are shown in Table 2.

TABLE 2

| | Discharge Capacity (mAh/g) | Cycle Life (@80% retention) |
|---|---|---|
| Example 1 | 1179 | 135 |
| Example 2 | 1163 | 125 |
| Example 3 | 1153 | 125 |
| Example 4 | 1157 | 125 |
| Example 5 | 1161 | 125 |
| Example 6 | 1145 | 120 |
| Comparative Example 1 | 1140 | 120 |
| Comparative Example 2 | 1120 | 100 |
| Comparative Example 3 | 1110 | 100 |
| Comparative Example 4 | 1130 | 70 |
| Comparative Example 5 | 1120 | 70 |
| Comparative Example 6 | 1160 | 50 |

When referring to Table 2, it is identified that the lithium-sulfur battery including the electrolyte for a lithium-sulfur battery according to the present disclosure has excellent capacity and lifetime properties. Specifically, it is identified that Examples 1 to 6 including the first solvent (2-methylfuran) in the content of 20% by volume to 49% by volume, the second solvent (dimethoxyethane) in the content of 50% by volume to 79% by volume and the third solvent (diethylene glycol dimethyl ether or triethylene glycol dimethyl ether) in the content of greater than or equal to 1% by volume and less than 25% by volume have enhanced discharge capacity and cycle life of the battery compared to Comparative Example 1 (not including the third solvent), Comparative Examples 2 and 3 (the third solvent content 25% by volume or greater), Comparative Examples 4 and 5 (the first solvent content less than 20% by volume) or Comparative Example 6 (including non-conjugated cyclic ether-based compound as the first solvent).

From such results, it is seen that the electrolyte for a lithium-sulfur battery including the organic solvent including the first solvent including a conjugated cyclic ether-based compound, the second solvent including dimethoxyethane and the third solvent including the glyme-based compound represented by Chemical Formula 1 in certain content ranges improves capacity and lifetime properties of the lithium-sulfur battery, and a significant decline in the capacity or lifetime properties is identified when any one of the above-described compositions is excluded or the content is outside the content range specified in the present disclosure.

The invention claimed is:

1. An electrolyte for a lithium-sulfur battery, the electrolyte comprising:
    a lithium salt; and
    a non-aqueous organic solvent,
    wherein the non-aqueous organic solvent includes:
        a first solvent including a conjugated cyclic ether-based compound;
        a second solvent including dimethoxyethane; and
        a third solvent including a glyme-based compound represented by Chemical Formula 1:

$R_1(CH_2CH_2O)_nR_2$     [Chemical Formula 1]

wherein in Chemical Formula 1,
    $R_1$ and $R_2$ are the same as or different from each other, and each independently an alkyl group or alkoxy group having 1 to 10 carbon atoms; and
    n is an integer of 2 to 4,
    wherein, based on 100% by volume of the non-aqueous organic solvent including the first solvent, the second solvent and the third solvent, the first solvent is included in an amount of 20% by volume to 49% by volume; the second solvent is included in an amount of 50% by volume to 79% by volume; and the third solvent is included in an amount of greater than or equal to 5% by volume and less than 25% by volume.

2. The electrolyte for a lithium-sulfur battery of claim 1, wherein the conjugated cyclic ether-based compound includes a 4- to 15-membered heterocyclic compound including an oxygen atom or a sulfur atom while including two or more double bonds.

3. The electrolyte for a lithium-sulfur battery of claim 1, wherein the conjugated cyclic ether-based compound includes one or more compounds selected from the group consisting of a furan-based compound and a thiophene-based compound.

4. The electrolyte for a lithium-sulfur battery of claim 3, wherein the furan-based compound includes one or more compounds selected from the group consisting of furan, 2-methylfuran, 3-methylfuran, 2-ethylfuran, 2-propylfuran, 2-butylfuran, 2,3-dimethylfuran, 2,4-dimethylfuran, 2,5-dimethylfuran, pyran, 2-methylpyran, 3-methylpyran, 4-methylpyran, benzofuran and 2-(2-nitrovinyl) furan.

5. The electrolyte for a lithium-sulfur battery of claim 3, wherein the thiophene-based compound includes one or more compounds selected from the group consisting of thiophene, 2-methylthiophene, 2-ethylthiophene, 2-propylthiophene, 2-butylthiophene, 2,3-dimethylthiophene, 2,4-dimethylthiophene and 2,5-dimethylthiophene.

6. The electrolyte for a lithium-sulfur battery of claim 1, wherein the glyme-based compound includes one or more compounds selected from the group consisting of diethylene glycol dimethyl ether, diethylene glycol methyl ethyl ether, triethylene glycol dimethyl ether, triethylene glycol methyl ethyl ether, tetraethylene glycol dimethyl ether and tetraethylene glycol methyl ethyl ether.

7. The electrolyte for a lithium-sulfur battery of claim 1, wherein, in Chemical Formula 1, $R_1$ and $R_2$ are each independently an alkyl group or alkoxy group having 1 to 5 carbon atoms.

8. The electrolyte for a lithium-sulfur battery of claim 6, wherein the glyme-based compound includes one or more compounds selected from the group consisting of diethylene glycol dimethyl ether, triethylene glycol dimethyl ether and tetraethylene glycol dimethyl ether.

9. A lithium-sulfur battery, comprising:
    a positive electrode including a positive electrode active material;
    a negative electrode including a negative electrode active material; and
    the electrolyte of claim 1.

10. The lithium-sulfur battery of claim 9, wherein the positive electrode active material comprises one or more selected from the group consisting of inorganic sulfur, $Li_2S_n$ (n≥1), disulfide compounds, organosulfur compounds and carbon-sulfur polymers having a structure of $(C_2S_x)_m$, wherein x is a number of 2.5 to 50, and m≥2.

11. The lithium-sulfur battery of claim 9, wherein the negative electrode active material comprises one or more selected from the group consisting of lithium metal and lithium alloys.

* * * * *